G. Q. SEAMAN.
GEAR SHIFTING DEVICE.
APPLICATION FILED FEB. 15, 1918.

1,296,436.

Patented Mar. 4, 1919.
2 SHEETS—SHEET 1.

WITNESSES

INVENTOR
George Q. Seaman
BY
ATTORNEYS

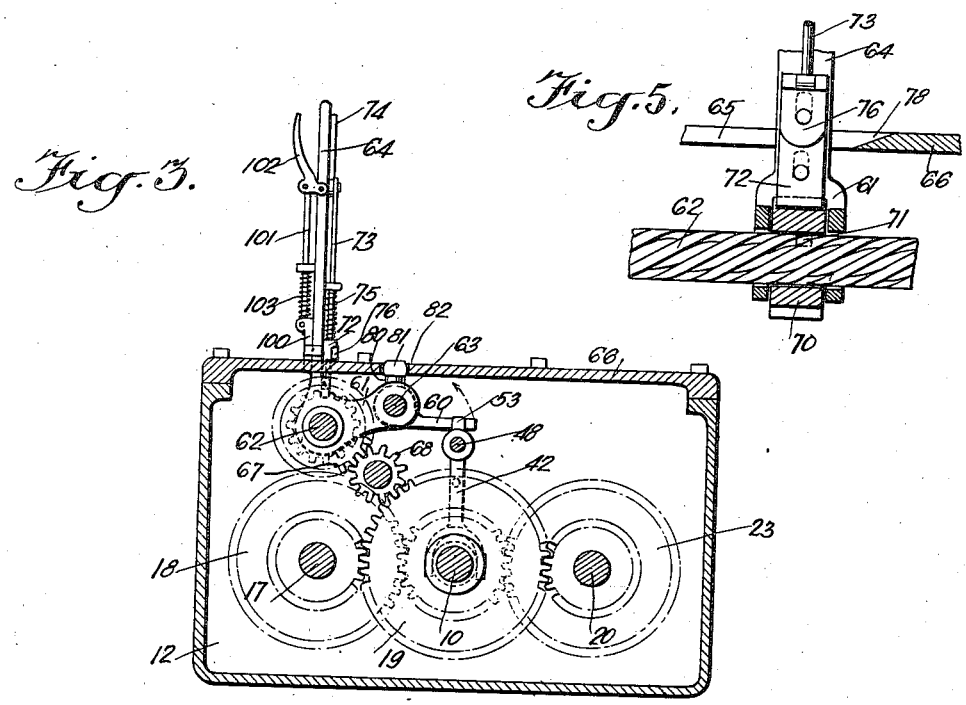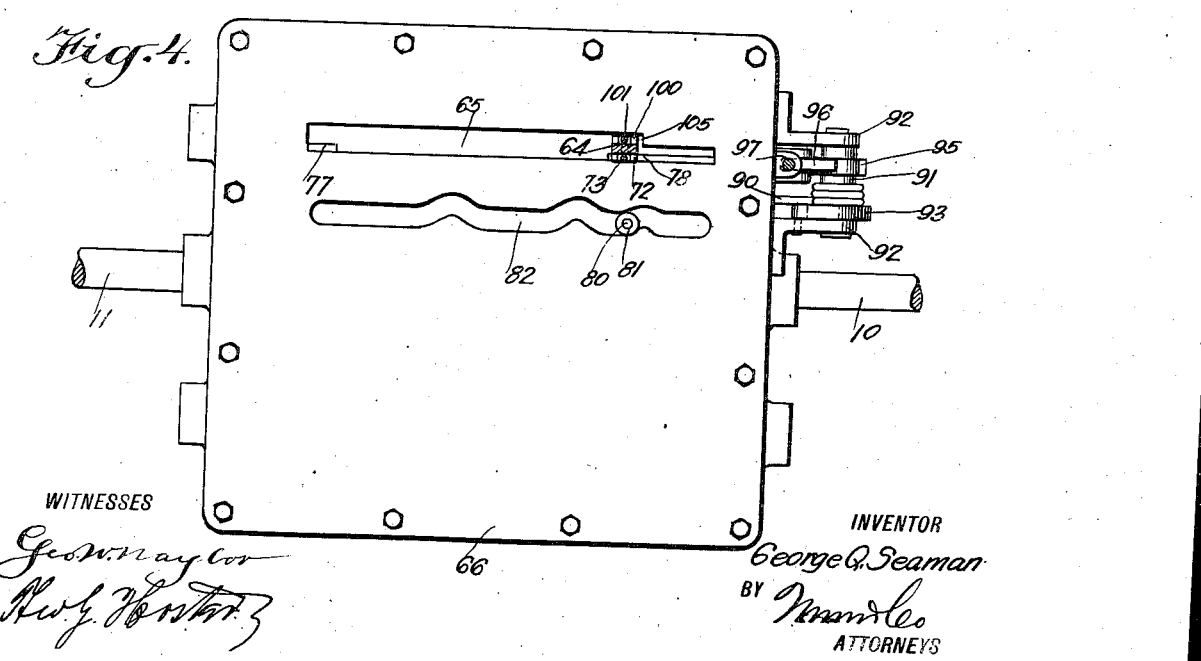

UNITED STATES PATENT OFFICE.

GEORGE Q. SEAMAN, OF BROOKLYN, NEW YORK.

GEAR-SHIFTING DEVICE.

1,296,436.

Specification of Letters Patent. Patented Mar. 4, 1919.

Application filed February 15, 1918. Serial No. 217,298.

*To all whom it may concern:*

Be it known that I, GEORGE Q. SEAMAN, a citizen of the United States, and a resident of the city of New York, borough of Brooklyn, in the county of Kings and State of New York, have invented a new and Improved Gear-Shifting Device, of which the following is a full, clear, and exact description.

The invention relates to change speed gearing such as shown and described in the Letters Patent of the United States, No. 1,236,113, granted to me on August 7, 1917.

The object of the present invention is to provide a new and improved gear shifting device arranged to shift the gears by power derived from the power shaft thus relieving the operator of undue physical exertion.

In order to accomplish the desired result, use is made of a power driven mechanical means adapted to engage the shifting devices of a change speed gearing to automatically shift from the lower speed to a higher speed.

A practical embodiment of the invention is represented in the accompanying drawings forming a part of this specification, in which similar characters of reference indicate corresponding parts in all the views.

Fig. 3 is a cross section of the same on the line 3—3 of Fig. 2;

Fig. 4 is a plan view of the same with the parts in section; and

Fig. 5 is an enlarged sectional side elevation of the carriage engaging the power-driven screw.

Figure 1:
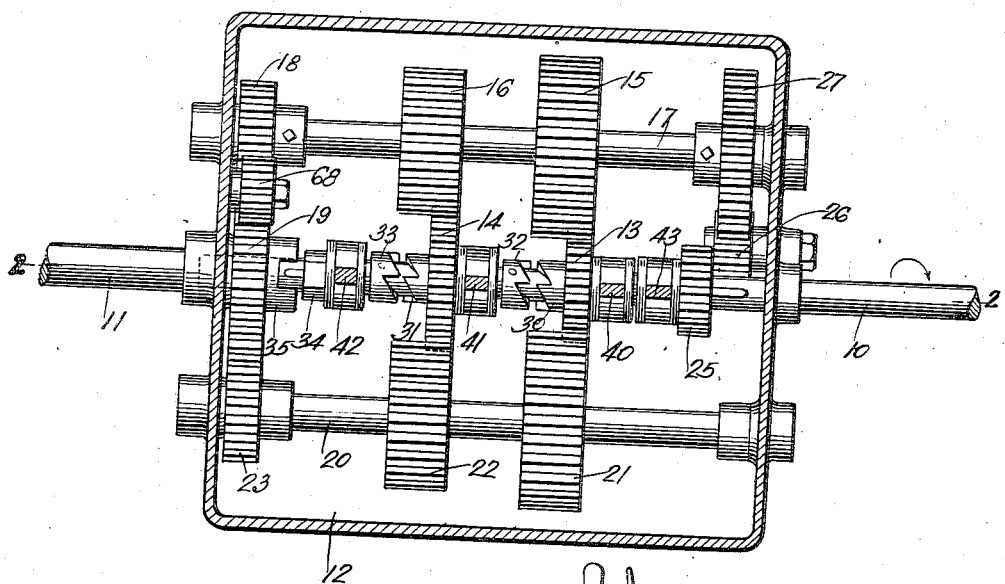
Figure 1 is a sectional plan view of a change speed gearing provided with the shifting device, the section being on the line 1—1 of Fig. 2.

The gear shifting device presently to be described in detail is shown applied to a change speed gearing of the construction set forth in the United States patent above referred to, but it is expressly understood that I do not limit myself to this particular application of my gear shifting device, which latter may be used on other forms of speed gearings. The change speed gearing shown in the drawings is arranged as follows: The power or engine shaft 10 is in axial alinement with the shaft 11 to be driven and the said shafts extend into a gear casing 12 and on the power shaft 10 are mounted to rotate loosely shifting gear wheels 13 and 14 of different diameters and in mesh with gear wheels 15 and 16 likewise of different diameters and secured on a countershaft 17 journaled on the casing 12 and arranged parallel to the shafts 10 and 11. The gear wheels 15 and 16 are considerably wider than the gear wheels 13 and 14 so that the latter remain at all times in mesh with the gear wheels 15 and 16 when shifting the gear wheels 13 and 14. On the countershaft 17 is secured a gear wheel 18 less in diameter than the gear wheel 16 and in mesh with a larger gear wheel 19 secured on the driven shaft 11. For counterbalancing purposes use is made of a second countershaft 20 journaled in the casing 12 and provided with gear wheels 21, 22 and 23 corresponding in diameter to the gear wheels 15, 16 and 18 and likewise in mesh with the gear wheels 13, 14 and 19. A reversing gear wheel 25 is mounted to rotate with and to slide endwise on the power shaft 10 and this gear wheel is adapted to be moved in mesh with an intermediate gear wheel 26 in mesh at all times with a gear wheel 27 secured on the countershaft 17. Normally the reversing gear wheel 25 is out of mesh with the intermediate gear wheel 26. When it is desired to reverse the gearing then the gear wheel 25 is moved in mesh with the intermediate gear wheel 26. Cam coupling members 30 and 31 are secured or formed on the gear wheels 13 and 14 and are adapted to engage corresponding cam coupling members 32, 33 fixed on the power shaft 10. A coupling member 34 is mounted to turn with and to slide lengthwise on the power shaft 10, and this coupling member 34 is adapted to engage a coupling member 35 secured to or formed on the gear wheel 19 so that when the coupling member 34 is in mesh with the coupling member 35 then the driven shaft 11 is directly driven from the power shaft 10.

Figure 2:
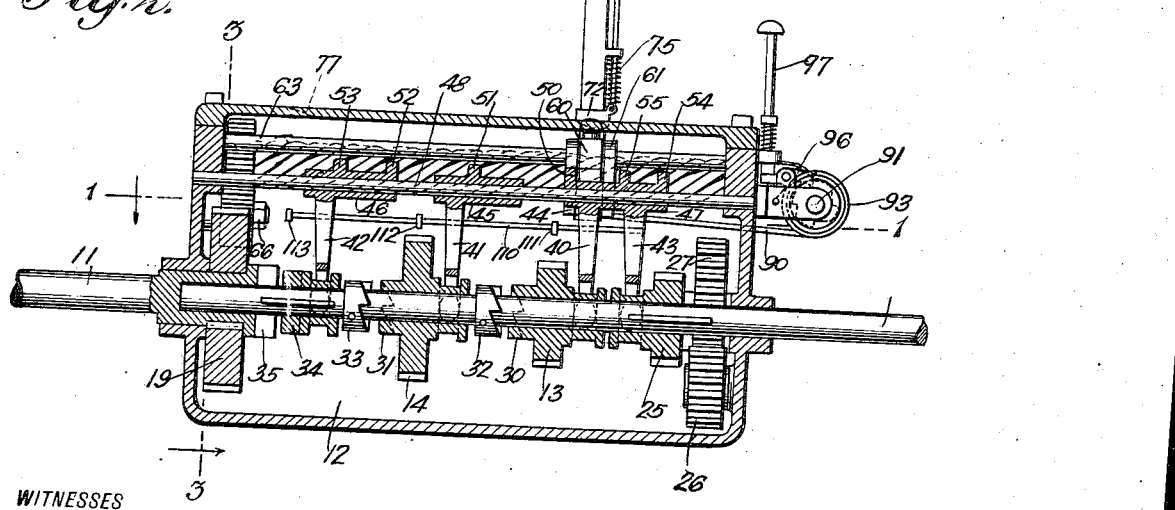
Fig. 2 is a sectional side elevation of the same on the line 2—2 of Fig. 1.

The gear wheels 13, 14, the coupling member 34 and the reversing gear wheel 25 are engaged by shifting forks 40, 41, 42 and 43 having hubs 44, 45, 46 and 47 mounted to slide on a rod or guideway 48 arranged within the casing 12. The hubs 44 and 45 are provided on top with lugs 50 and 51, and the hub 46 is provided on top with two spaced lugs 52, 53, and the hub 47 is likewise provided with two spaced lugs 54 and 55, as plainly shown in Fig. 2. The lugs of the shifting forks 40, 41, 42 and 43 are adapted to be engaged by an arm 60 moving bodily with a fork-shaped carriage 61 mounted to travel on a screw 62 extending within the casing 12 and journaled therein. The carriage also slidingly engages a guide rod 63 held in the casing and forming a pivot for the arm 60 to swing up and down on. The carriage 61 is provided with an upwardly extending handle 64 passing through a slot 65 formed in the top 66 of the casing 12. The screw 62 is driven from the gear wheel 19 by gear wheels 67 and 68, as plainly shown in Fig. 3. Between the fork members of the carriage 61 is held a pinion 70 mounted to turn on the screw 62, and the said pinion is provided with a pin 71 extending between adjacent threads of the screw 62 so that when the pinion is held against turning and the screw 62 is rotated then a traveling motion from the right to the left is given to the carriage 61. A locking pin 72 is held to slide up and down on the handle 64 of the carriage 61 and is adapted to engage the pinion 70 to hold the same against rotation for the purpose mentioned. The pin 72 is connected by a link 73 with a handle lever 74 fulcrumed on the carriage handle 64 and under the control of the operator. A spring 75 coiled on the link 73 presses the pin 72 to normally hold the same in engagement with the pinion 70. The pin 72 is provided on its face with a cam 76 (see Figs. 3 and 5) adapted to engage an incline 77 formed on the top 66 at the left-hand end of the slot 65 (see Fig. 4) so that when the carriage 61 nears the end of its travel from the right to the left then the cam 76 travels up the incline 77 and thus lifts the locking pin 72 out of engagement with the pinion 70 to automatically stop the carriage 61. The pinion 70 now freely rotates with the screw 62. When the carriage 61 is moved from the left to the right either by hand or automatically, as hereinafter more fully explained, then the cam 70 engages an incline 78 formed on the cover 66 to lift the locking pin 72 out of engagement with the pinion 70 at the time the carriage is in normal neutral position or moved farther to the right into reversing position, as hereinafter more fully explained.

The arm 60 is provided with an upwardly extending pin 80 on which is journaled a friction roller 81 engaging a cam 82 formed on the cover 66 and shaped relative to the lugs 50, 51, 52, 53, 54 and 55 to normally hold the arm 60 in a horizontal position for sidewise engagement with the lugs 50, 51, 52, 53, 54 and 55 and to swing the same up out of engagement with the said lugs to pass over the same after the desired shifting has been accomplished.

When the change speed gearing is in neutral position, as shown in the drawings, then the operator pushes on the handle 64 from the right to the left to shift the shifting fork 40 in a like direction and with it the gear wheel 13 and its coupling member 30 to engage the latter with the coupling member 32 thus driving the shaft 11 from the motor shaft 10, as previously described. The cam 76 during this shifting movement moves down the incline 78 and the locking pin 72 now engages the pinion 70 so that the pinion is held against rotation and a traveling movement from the right to the left is now given to the carriage 61. The carriage now keeps on traveling and in doing so the friction roller 81 swings the arm 60 out of engagement with the lug 50 so that the arm 60 can pass over the said lug. The arm 60 during the further movement to the left of the carriage 61 next engages the lug 51 whereby the shifting fork 41 is moved to the left and with it the gear wheel 14 which by the coupling member 31 connects with the coupling member 33, so that the rotary motion of the motor shaft 10 is transmitted to the countershafts 17 and 20 at a higher rate of speed. As soon as the coupling member 31 engages the coupling member 33 the arm 60 is swung upward out of engagement with the lug 51 by the friction roller 81 engaging a corresponding portion of the cam 82, and the said arm 60 on its further travel to the right passes over the lug 52 and finally engages the lug 53 thus moving the shifting fork 42 and with it the coupling member 34 to the left to engage the coupling member 34 with the coupling member 35 to rotate the driven shaft 11 directly from the power shaft 10. As soon as the coupling member 34 engages the coupling member 35 the cam 76 travels up the incline 77 so that the locking pin 72 is withdrawn from the pinion 70 and the latter now freely rotates with the screw 62 while the carriage 61 is at a standstill. During the return movement of the carriage 61 the arm 60 engages the lug 52 thus moving the shifting fork 42 to the right whereby the clutch member 34 is moved out of engagement with the clutch member 35 thus stopping the driven shaft 11.

In order to automatically return the carriage 62 to neutral or starting position, use is made of the following device: One end of a cable, band or other flexible connection 90 is secured to the carriage and its other end winds up on a shaft 91 journaled in suitable bearings 92 arranged on the outside of the casing 12. A coil spring 93 is secured at one end to one of the bearings 92 and its other end is attached to the shaft 91. Thus when the carriage moves from the right to the left the flexible connection 90 rotates the shaft 91 and thus places a spring 93 under tension, and when the carriage is released by the operator withdrawing the pin 72 from the pinion 70 then the spring 93 rotates the shaft 91 in an opposite direction thus winding up the flexible connection 90 whereby the carriage is moved from the left back to the right to starting position. On the shaft 91 is secured a ratchet wheel 95 engaged by a spring-pressed pawl 96 pivoted on the casing 12 and controlled by a spring-pressed rod 97 mounted to slide on the casing 12. It is understood that when the carriage moves from the right to the left and the spring 93 is moved under tension the pawl 96 holds the shaft 91 against rotation in a reverse direction until the operator presses the pin 97 and swings the pawl 96 out of engagement with the ratchet wheel 95, when the spring 93 exerts its power to return the carriage to neutral position.

In order to prevent the carriage 61 from moving too far to the right by the carriage-returning device just described, use is made of a pin 100 mounted to slide up and down on the carriage handle 64 and pivotally connected by a link 101 with a handle lever 102 fulcrumed on the carriage handle 64. A spring 103 coiled on the link 101 presses the locking pin 100 downward to normally hold the same in engagement with the slot 65. The right-hand end of the slot 65 is made narrow to provide a shoulder 105 (see Fig. 4) against which the pin 100 is adapted to abut to arrest the return movement of the carriage 61 at the time it reaches a neutral position. When it is desired to reverse, the operator presses the lever 102 thus withdrawing the pin 100 from the slot 65 and allowing the operator to move the carriage farther to the right to pass the arm 60 between the lugs 55 and 54 to shift the gear wheel 25 into engagement with the intermediate gear wheel 26 on further movement of the carriage 61 to the right by the operator correspondingly pressing on the handle 64.

In order to insure a positive disengagement of the clutch members 30, 31 and 34 from the clutch members 32, 33 and 35 at the time it is desired to reverse, use is made of a rod 110 secured to the shifting fork 43 and extending through the shifting forks 40, 41 and 42. On the rod 110 are secured collars 111, 112 and 113 adapted to engage the left-hand sides of the shifting forks 40, 41 and 42 at the time the shifting fork 43 is moved to the right so that the shifting forks 40, 41 and 42 move the corresponding clutch members 30, 31 and 34 positively out of engagement with the clutch members 32, 33 and 35.

Having thus described my invention, I claim as new and desire to secure by Letters Patent:—

1. A gear shifting device for a change speed gearing, comprising a screw mounted to turn and be rotated from the power shaft, a carriage mounted to travel and having means adapted to engage the screw to cause the carriage to travel on rotating the screw, and a shifting member mounted on the carriage and adapted to engage the shifting means of the change speed gearing.

2. In a change speed gearing, a screw mounted to turn and be driven from the power shaft, a carriage having means engaging the screw to cause the latter to impart a traveling motion to the carriage, an arm pivoted on the said carriage and adapted to engage the shifting means of the change speed gearing, and a cam engaging the said arm to automatically move the latter out of engagement with the corresponding shifting means.

3. In a change speed gearing, a screw mounted to turn and be driven from the power shaft, a carriage having means engaging the screw to cause the latter to impart a traveling motion to the carriage, an arm pivoted on the said carriage and adapted to engage the shifting means of the change speed gearing, a cam engaging the said arm to automatically move the latter out of engagement with the corresponding shifting means, and automatic means to return the carriage to starting position on releasing the carriage from the screw.

4. A gear shifting device for change speed gearing, comprising a revoluble screw driven from the power shaft, a carriage mounted to travel, a pinion movable bodily with the said carriage and having engaging means engaging the said screw, a manually controlled locking means mounted on the said carriage and adapted to engage the said pinion to impart a traveling motion to the said carriage, a shifting arm pivoted on the said carriage and adapted to successively engage the several shifting devices of the change speed gearing, and a fixed cam engaged by the said arm to move the latter out of engagement with a shifting device after the latter has been moved into active coupling position.

5. A gear shifting device for change speed gearing, comprising a revoluble screw driven from the power shaft, a carriage mounted to travel, a pinion movable bodily with the said carriage and having engaging means engaging the said screw, a manually controlled locking means mounted on the said carriage and adapted to engage the said pinion to impart a traveling motion to the said carriage, a shifting arm pivoted on the said carriage and adapted to successively engage the several shifting devices of the change speed gearing, a fixed cam engaged by the said arm to move the latter out of engagement with a shifting device after the latter has been moved into active coupling position, and means connected with the said carriage to return the latter to starting position on disengaging the said locking means from the pinion.

6. A gear shifting device for change speed gearing, comprising a revoluble screw driven from the power shaft, a carriage mounted to travel, a pinion moving bodily with the said carriage and having engaging means engaging the said screw, a manually controlled locking means mounted on the said carriage and adapted to engage the said pinion to impart a traveling motion to the said carriage, a shifting arm pivoted on the said carriage and adapted to successively engage the several shifting devices of the change speed gearing, a fixed cam engaged by the said arm to move the latter out of engagement with a shifting device after the latter has been moved into active coupling position, a spring actuated returning device connected with the said carriage and having manually controlled locking means which when unlocked cause the said returning device to return the carriage to starting position.

7. A gear shifting device for change speed gearing, comprising a revoluble screw driven from the power shaft, a carriage mounted to travel, a pinion moving bodily with the said carriage and having engaging means engaging the said screw, a manually controlled locking means mounted on the said carriage and adapted to engage the said pinion to impart a traveling motion to the said carriage, a shifting arm pivoted on the said carriage and adapted to successively engage the several shifting devices of the change speed gearing, a fixed cam engaged by the said arm to move the latter out of engagement with a shifting device after the latter has been moved into active coupling position, a shaft, a coil spring fixed at one end and attached at its other end to the said shaft, and a band winding and unwinding on the said shaft and connected with the said carriage to return the latter when released to starting position.

8. A gear shifting device for change speed gearing, comprising a revoluble screw driven from the power shaft, a carriage mounted to travel, a pinion moving bodily with the said carrier and having engaging means engaging the said screw, a manually controlled locking means mounted on the said carriage and adapted to engage the said pinion to impart a traveling motion to the said carriage, a shifting arm pivoted on the said carriage and adapted to successively engage the several shifting devices of the change speed gearing, a fixed cam engaged by the said arm to move the latter out of engagement with a shifting device after the latter has been moved into active coupling position, a shaft, a coil spring fixed at one end and attached at its other end to the said shaft, a band winding and unwinding on the said shaft and connected with the said carriage to return the latter when released to starting position, and a manually controlled locking means for the said shaft.

9. In a change speed gearing, a screw mounted to turn and driven from the power shaft, a carriage having means engaging the screw to cause the latter to impart a traveling motion to the carriage, an arm pivoted on the said carriage and adapted to engage the shifting means of the change speed gearing, a cam engaging the said arm to automatically move the latter out of engagement with the corresponding shifting means, and means for arresting the return movement of the carriage at the time it reaches a neutral position.

GEORGE Q. SEAMAN.